(12) United States Patent
Lee et al.

(10) Patent No.: US 8,822,073 B2
(45) Date of Patent: *Sep. 2, 2014

(54) ELECTRODE WITH ORGANIC/INORGANIC COMPOSITE AND ELECTROCHEMICAL DEVICE COMPRISING THE SAME

(75) Inventors: Sang-Young Lee, Daejeon (KR);
Dae-Jong Seo, Daejeon (KR);
Dong-Myung Kim, Daejeon (KR);
Seok-Koo Kim, Daejeon (KR);
Hyun-Min Jang, Daejeon (KR)

(73) Assignee: LG Chem, Ltd. (KR)

(*) Notice: Subject to any disclaimer, the term of this patent is extended or adjusted under 35 U.S.C. 154(b) by 1229 days.

This patent is subject to a terminal disclaimer.

(21) Appl. No.: 12/309,283

(22) PCT Filed: Jul. 18, 2007

(86) PCT No.: PCT/KR2007/003472
§ 371 (c)(1),
(2), (4) Date: Aug. 4, 2010

(87) PCT Pub. No.: WO2008/010667
PCT Pub. Date: Jan. 24, 2008

(65) Prior Publication Data
US 2010/0290044 A1 Nov. 18, 2010

(30) Foreign Application Priority Data
Jul. 19, 2006 (KR) .......................... 10-2006-0067657

(51) Int. Cl.
*H01M 4/13* (2010.01)
(52) U.S. Cl.
USPC .......................... 429/209; 356/209

(58) Field of Classification Search
USPC .................................................. 356/326, 402
See application file for complete search history.

(56) References Cited

U.S. PATENT DOCUMENTS

| 5,162,178 | A | * | 11/1992 | Ohsawa et al. ............... 429/213 |
| 5,298,346 | A | | 3/1994 | Gyenes |
| 5,336,573 | A | | 8/1994 | Zuckerbrod et al. |
| 5,882,721 | A | | 3/1999 | Delnick |
| 6,365,299 | B1 | | 4/2002 | Miyaki et al. |

(Continued)

FOREIGN PATENT DOCUMENTS

| EP | 0814520 A2 | 12/1997 |
| EP | 1659650 A1 | 5/2006 |

(Continued)

OTHER PUBLICATIONS

Panitz et al. J. Power Sources 2001 (97) 174-180.*

(Continued)

*Primary Examiner* — Ula C Ruddock
*Assistant Examiner* — Lisa S Park Gehrke
(74) *Attorney, Agent, or Firm* — Lerner, David, Littenberg, Krumholz & Mentlik, LLP

(57) ABSTRACT

Disclosed is an electrode comprising an organic/inorganic composite introduced onto either surface or both surfaces thereof, the organic/inorganic composite comprising inorganic particle or aggregates thereof having a unique spectrum or color pattern according to a predetermined rule, and a polymer capable of interconnecting and fixing the inorganic particles. Also, disclosed are an electrochemical device comprising the above electrode, and a method for identifying the origin or kind of an electrode itself or an electrochemical device comprising the same by using the above electrode.

16 Claims, 5 Drawing Sheets

(56) References Cited

U.S. PATENT DOCUMENTS

| | | |
|---|---|---|
| 7,005,211 B2 | 2/2006 | Kim et al. |
| 2004/0239291 A1* | 12/2004 | Watanabe .................... 320/106 |
| 2005/0204920 A1 | 9/2005 | Hong et al. |
| 2005/0266150 A1* | 12/2005 | Yong et al. .................... 427/58 |
| 2006/0078791 A1 | 4/2006 | Hennige et al. |
| 2006/0283931 A1* | 12/2006 | Polli et al. .................... 235/375 |
| 2007/0292765 A1 | 12/2007 | Inoue et al. |
| 2010/0290044 A1 | 11/2010 | Lee et al. |

FOREIGN PATENT DOCUMENTS

| | | |
|---|---|---|
| EP | 1696499 A1 | 8/2006 |
| JP | 02019080 A | 1/1990 |
| JP | 10064525 A | 3/1998 |
| JP | 10334877 A | 12/1998 |
| JP | 2001307778 A | 11/2001 |
| JP | 2004171876 A | 6/2004 |
| JP | 2004335229 A | 11/2004 |
| JP | 2005174792 A | 6/2005 |
| JP | 2006185728 A | 7/2006 |
| KR | 2000-0019372 A | 4/2000 |
| KR | 2001-0091048 A | 10/2001 |
| KR | 2002-0071204 A | 9/2002 |
| KR | 20040095162 A | 11/2004 |
| KR | 20060011247 A | 2/2006 |
| KR | 20060023472 A | 3/2006 |
| KR | 20080008232 A | 1/2008 |
| WO | 2005057691 A1 | 6/2005 |
| WO | 2005076388 A1 | 8/2005 |
| WO | 2005098997 A1 | 10/2005 |
| WO | 2006/068428 | 6/2006 |
| WO | 2006061940 A1 | 6/2006 |
| WO | 2007066966 A1 | 6/2007 |

OTHER PUBLICATIONS

Maurice M. Bursey, "Spectroscopy," in AccessScience, © McGraw-Hill Companies, 2008, http://www.accessscience.com.*

International Search Report, PCT/KR2007/004665.

* cited by examiner (a) CoAl$_2$O$_4$ (b) Cr$_2$O$_3$ (c) Fe$_2$O$_3$ (d) (Ti,Ni,Sb)O$_2$ (a) Ex. 1

(b) Ex. 2

(c) Ex. 3

(d) Ex. 4

(e) Ex. 5

(f) Ex. 6

(a)

(b)

ELECTRODE WITH ORGANIC/INORGANIC COMPOSITE AND ELECTROCHEMICAL DEVICE COMPRISING THE SAME

CROSS REFERENCE TO RELATED APPLICATIONS

The present application is a national phase entry under 35 U.S.C. §371 of International Application No. PCT/KR2007/003472, filed Jul. 18, 2007, published in English, which claims the benefit of Korean Patent Application No. 10-2006-0067657, filed Jul. 19, 2006. The disclosures of all of said applications are incorporated by reference herein.

TECHNICAL FIELD

The present invention relates to an identifiable electrode that allows users to easily identify the origin or kind of the electrode itself or an electrochemical device using the same electrode. Also, the present invention relates to an electrochemical device using the above electrode.

BACKGROUND ART

Electrochemical devices are power sources for electronic appliances, etc. As the use of batteries is enlarged to applications for the storage of energy for portable telephones, camcorders, notebook computers, personal computers and electric vehicles, efforts on the research and development of batteries are increasingly embodied.

Meanwhile, since the electrochemical devices have been in increasing demand, counterfeits thereof have been distributed more and more. Such counterfeits have lower safety than authentic products. However, when an electrochemical device causes explosion due to the counterfeit, it is difficult to check the authenticity of the device. Therefore, there has been an imminent need for a method for checking the authenticity of an electrochemical device.

According to the prior art, there has been suggested a method for checking the authenticity of an electrochemical device by incorporating a semiconductor capable of communicating with the main body of an electronic appliance into the electrochemical device. However, the above method requires an additional space for housing the semiconductor inside the device, so that the space for receiving electrodes inside the device grows smaller. This ultimately results in a drop in the capacity of a battery. Additionally, such introduction of a semiconductor into the electrochemical device causes degradation of the productivity and cost-efficiency.

DISCLOSURE

Technical Problem

Therefore, the present invention has been made in view of the above-mentioned problems. It is an object of the present invention to provide an electrode comprising an organic/inorganic composite into which inorganic particle(s) having a unique spectrum or color pattern is(are) introduced according to a predetermined rule, so that the electrode or an electrochemical device using the same allows users to identify its origin or kind.

Technical Solution

In order to achieve the above-mentioned object, there is provided an electrode comprising an organic/inorganic composite introduced onto either surface or both surfaces thereof, the organic/inorganic composite comprising inorganic particle or aggregates thereof having a unique spectrum or color pattern according to a predetermined rule, and a polymer capable of interconnecting and fixing the inorganic particles. Also, there is provided an electrochemical device comprising the above electrode. Further, there is provided a method for identifying the origin or kind of the electrode itself or the electrochemical device comprising the same by using the electrode.

Hereinafter, the present invention will be explained in more detail.

In general, an electrochemical device comprises a cathode, an anode, a separator and an electrolyte. The above constitutional elements have been developed to have various structural characteristics in order to improve the quality of the device. For example, an organic/inorganic composite may be introduced onto the surface of an electrode. The organic/inorganic composite serves as a separator, is bound firmly to the interface with an electrode, and has little possibility of heat shrinking. Thus, it is possible to improve the quality and safety of the device.

The organic/inorganic composite may comprise inorganic particle(s); and a polymer capable of interconnecting and fixing the inorganic particles. As the inorganic particles, white inorganic particles, such as alumina, silica or titania, have been used widely. Moreover, there is no disclosure of such organic/inorganic composites used to identify the origin or kind of the electrode or electrochemical device.

According to the present invention, inorganic particle(s) having a unique spectrum or color pattern is(are) introduced into the organic/inorganic composite as the inorganic component according to a predetermined rule, so as to make the electrode itself identifiable.

Each kind of inorganic particle has its unique spectrum or color pattern. Therefore, when such inorganic particle(s) is(are) introduced into an organic/inorganic composite according to a predetermined rule, the electrode comprising the same organic/inorganic composite can be identifiable like a trademark.

Herein, the above "predetermined rule" means a specific spectrum (peak position and intensity) and/or color pattern determined preliminarily so that the organic/inorganic composite or electrode according to the present invention can be distinguished from the others manufactured by a third party. Particularly, the specific spectrum (peak position and intensity) and/or color pattern may be variable depending on the number, kind, content, etc. of the inorganic particles used in the organic/inorganic composite. For example, it is possible to control the peak position and intensity by using one or more kinds of inorganic particles and by adjusting the amounts of the particles. Otherwise, it is possible to control the color pattern by using one or more kinds of inorganic particles capable of developing a color in the visible light or non-visible light range; or one or more kinds of inorganic particles capable of developing a color or undergoing a color change under a specific chemical condition (e.g. temperature, oxidation state, etc.). Further, it is possible to control both the spectrum and the color pattern by using at least two kinds of inorganic particles in combination or by varying the arrangement of the particles.

Therefore, according to the present invention, it is possible to identify the origin or kind of the electrode itself or the electrochemical device comprising the same by checking the spectrum and/or color pattern of the organic/inorganic composite. Particularly, according to the present invention, the electrode itself functions as a means for identification. Thus, no additional space for an identification means is required, thereby preventing a drop in the capacity of the electrochemical device. Also, the identification method according to the present invention may be applied to counterfeits made only inside the electrochemical device.

There is no particular limitation in the inorganic particle used in the present invention, as long as the particle has its unique spectrum or color pattern.

For example, the inorganic particle includes: (i) inorganic particles having a unique spectrum or color pattern in the visible light range; (ii) inorganic particles having a unique spectrum or color pattern in the non-visible light range; or (iii) inorganic particles having a unique spectrum or color pattern under a specific chemical condition (e.g. temperature or oxidation state). Additionally, inorganic particles used in paints or pigments, or phosphor particles used in display devices or lamps may be used in the present invention.

Non-limiting examples of the inorganic particle having a unique spectrum or color pattern, such as a white, black, yellow, orange, brown, red, violet, blue, green, gray, pink or fluorescent color, in the visible light range (a wavelength range of 380~770 nm) are as follows:

(a) white: $Al_2O_3$, ZnO, ZnS, $SiO_2$, $ZrO_2$, $SnO_2$, $CeO_2$, MgO, CaO, $Y_2O_3$, $TiO_2$, $Sb_2O_3$, $BaTiO_3$, $SrTiO_3$, $Pb(Zr,Ti)O_3$ (PZT) $Pb_{1-x}La_xZr_{1-y}Ti_yO_3$ (PLZT), etc.

(b) black: $Fe_3O_4$, (Co, Ni)O—(Cr, Fe)$_2O_3$, etc.

(c) yellow: $PbCrO_4$, ZnCrO4, $BaCrO_4$, CdS, FeO(OH) $nH_2O$, $TiO_2$—NiO—$Sb_2O_3$, $Pb(CN)_2$, $Ca_2PbO_4$, Al, Fe, Sn-2PbO—$Sb_2O_5$, V—$SnO_2$,V—$ZrO_2$, Pr—$ZrSiO_4$, $CrSbO_4$ or $Cr_2WO_6$—$TiO_2$, $ZrSO_4$ coated CdS or (CdZn)S, etc.

(d) orange: $PbCrO_4$ PbO, $PbCrO_4$ $PbMoO_4$ $PbSO_4$, etc.

(e) brown: $Fe_2O_3$+FeO, $Fe_2O_3$+$MnO_2$+$Mn_3O_4$, ZnO.(Al, Cr, Fe)$_2O_3$, etc.

(f) red: $Fe_2O_3$, $Pb_3O_4$, HgS, CdS+CdSe, CdS+HgS, $2Sb_2S_3$ $Sb_2O_3$, etc.

(g) violet: $Co_3(PO_4)_2$, $CO_3(PO_4)_2$ $4H_2O$, $CO_3(PO_4)_2$ $8H_2O$, etc.

(h) blue: 3NaAl $SiO_4$ $Na_2S_2$, $Fe_4[Fe(CN)_6]_3$ $nH_2O$, CoO $nAl_2O_3$, CoO $nSnO_2$ mMgO, $Co_3O_4$+$SiO_2$+$Al_2O_3$+$Fe_2O_3$+NiO+MnO, CoO-$nAl_2O_3$ or (Co, Zn)O-$nAl_2O_3$, 2(Co, Zn)O. $SiO_2$, V—$ZrSiO_4$, etc.

(i) green: $Cr_2O_3$, $Cr_2O(OH)_4$, $Cu(CH_3CO_2)_2$ 3CuO $(AsO_2)_2$, CoO—ZnO—MgO, (Co, Zn)O.(Al, Cr)$_2O_3$, 3CaO—$Cr_2O_3$.$3SiO_2$, (Al, Cr)$_2O_3$, etc.

(j) gray: Sb—$SnO_2$, Co, Ni—$ZrSiO_4$, etc.

(k) pink: Mn, P-α-$Al_2O_3$, ZnO.(Al, Cr)$_2O_3$, Cr—CaO.$SnO_2$.$SiO_2$, Fe—$ZrSiO_4$, Cr,Co—CaO.$SnO_2$.$SiO_2$, $ZrSiO_4$ coated Cd(S,Se), etc.

(l) fluorescent color: ZnS, $Zn_2SiO_4$, (Zn,Cd)S, CaS, SrS, $CaWO_4$, etc.

(m) others: SiC (green and/or black), $Si_3N_4$(white), etc.

Although there is no particular limitation in the size of the inorganic particle, the inorganic particle preferably has a size of 0.001 μm~10 μm. If the size is less than 0.01 μm, the pores formed by the inorganic particles are too small. Thus, it may be difficult to transfer lithium ions through the organic/inorganic composite. If the size is greater than 10 μm, the resultant electrode has an increased thickness.

Meanwhile, a polymer capable of interconnecting and fixing the inorganic particles may be used a binder polymer currently used in the art. The polymer serves as a binder that interconnects and stably fixes the inorganic particles among themselves, and between the inorganic particles and the surface of an electrode active material, and thus prevents degradation in mechanical properties of a final resultant organic/inorganic composite.

The polymer preferably has a glass transition temperature (Tg) of between −200° C. and 200° C. in order to improve mechanical properties such as flexibility and elasticity of a final resultant organic/inorganic composite.

Additionally, the polymer preferably shows a high degree of swelling with an electrolyte by being gelled when impregnated with an electrolyte, and more preferably has a solubility parameter between 15 and 45 $MPa^{1/2}$.

Non-limiting examples of the polymer that may be used in the present invention include polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, polyvinylalcohol or mixtures thereof.

There is no particular limitation in the ratio of the inorganic particles to the polymer forming the organic/inorganic composite according to the present invention. The ratio may be controlled in a range of 10:90~99:1 (on the weight basis), and preferably of 50:50~99:1 (on the weight basis), depending on the thickness and physical properties of the finally formed electrode and the content of the inorganic particles defined by the predetermined rule.

The organic/inorganic composite according to the present invention may further comprise other additives.

Meanwhile, the organic/inorganic composite according to the present invention has pores. The pores can be capable of lithium ion conduction when they are subsequently impregnated with an electrolyte. The pores may be formed among the inorganic particles, between inorganic particles and polymers, or by an entangled structure of the polymers. Additionally, the pore has a size depending on the size of the inorganic particles.

The electrode according to the present invention comprises the organic/inorganic composite bound to either surface or both surfaces thereof. For example, the electrode according to the present invention may comprise the organic/inorganic composite entangled with the pores of the electrode by the polymers. In this case, the organic/inorganic composite is preferably introduced to a predetermined thickness (more preferably to a thickness of 1~10 μm), along the thickness direction of the electrode so that the organic/inorganic composite is sufficiently impregnated with the electrolyte and can function also as an electrolyte. For reference, FIG. 1 shows the electrode having the organic/inorganic composite introduced onto either surface or both surfaces thereof according to the present invention.

One embodiment of the method for manufacturing the electrode according to the present invention comprises the steps of: (a) dissolving a polymer capable of functioning as a binder into a solvent to provide a first mixed solution; (b) adding at least one kind of the aforementioned inorganic particles to the first mixed solution of step (a) and mixing them to provide a second mixed solution; and (c) coating the second mixed solution onto the surface of an electrode, followed by drying.

Although there is no particular limitation in the solvent used in step (a), the solvent preferably has a solubility parameter similar to the solubility of the polymer and a low boiling point in order to facilitate uniform mixing and removal of the solvent.

Non-limiting examples of such solvents include acetone, tetrahydrofuran, methylene chloride, chloroform, dimethylformamide, N-methyl-2-pyrrolidone (NMP), cyclohexane, water and mixtures thereof.

Meanwhile, in step (b), it is preferred to perform crushing of the inorganic particles after at least one kind of the aforementioned inorganic particles is added to the first mixed solution. The time for crush is suitably 1-20 hours. The particle size of the crushed particles ranges preferably from 0.01 and 10 μm. Conventional crush methods, preferably a method using a ball mill may be used.

And, in step (c), the conventional coating methods known to one skilled in the art may be used. It is possible to use various processes including dip coating, die coating, roll coating, comma coating or combinations thereof.

Meanwhile, there is no particular limitation in the electrode into which the organic/inorganic composite is introduced, as long as the electrode is one currently used in electrochemical devices. In general, the electrode comprises an electrode active material bound to a current collector.

The electrode active material may include a cathode active material and an anode active material.

Non-limiting examples of the cathode active material include: lithium transition metal composite oxides, including $LiM_xO_y$ (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium disulfide, molybdenum disulfide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (wherein $0\leq y<1$), $Li(Ni_aCo_b$-$Mn_c)O_4$ ($0<a<2$, $0<b<2$, $0<c<2$, $a+b+c=2$), $LiMn_{2-z}Ni_zO_4$, $LiMn_{2-z}Co_zO_4$(wherein $0<Z<2$), $LiCoPO_4$, $LiFePO_4$ or a mixture thereof is particularly preferred.

Anode active materials may include any conventional anode active materials currently used in an anode of a conventional secondary battery. Particular non-limiting examples of the anode active material include lithium intercalation materials such as lithium metal, lithium alloys, carbon, petroleum coke, activated carbon, graphite or carbon fiber. Further, Anode active materials may include metal oxide, such as $TiO_2$, $SiO_2$, etc., capable of lithium intercalation/deintercalation and having a potential vs. Li of less than 2V. Particularly, carbonaceous materials, such as activated carbon, graphite or carbon fiber, etc., are particularly preferred.

Additionally, the present invention provides an electrochemical device comprising a cathode and an anode, wherein either or both of the cathode and the anode are the electrodes as described above.

The electrochemical device according to the present invention includes all types of devices in which electrochemical reactions are performed. Particular examples of the electrochemical device include all types of primary batteries, secondary batteries, fuel cells, solar cells, capacitors, or the like. Examples of the secondary batteries include lithium metal secondary batteries, lithium ion secondary batteries, lithium polymer secondary batteries or lithium ion polymer secondary batteries.

The electrochemidal device may be obtained by using a conventional method known to those skilled in the art, except that the cathode and/or the anode is the aforementioned electrode, comprising the organic/inorganic composite introduced thereto. For example, the method may comprise the steps of: (a) inserting a separator between the cathode and the anode, each or both comprising the organic/inorganic composite introduced thereto, to form an electrode assembly, and introducing the electrode assembly into a casing for an electrochemical device; and (b) injecting an electrolyte to the casing.

Although there is no particular limitation in the separator that may be used in the present invention, a porous separator is preferred, and non-limiting examples thereof include polypropylene-based, polyethylene-based, and polyolefin-based porous separators.

Since the organic/inorganic composite according to the present invention may serve also as a separator, the step of inserting the separator may not be required for the method for manufacturing the electrochemical device.

The electrolyte includes a conventional electrolyte known to those skilled in the art, and generally comprises an electrolyte salt and an electrolyte solvent.

There is no particular limitation in the electrolyte salt, as long as the salt is conventionally used as an electrolyte salt for a non-aqueous electrolyte.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred.

The electrolyte solvent that may be used in the present invention includes cyclic carbonates, linear carbonates, lactone, ether, ester, acetonitrile, lactam, ketone, or the like. Non-limiting examples of the cyclic carbonates include ethylene carbonate (EC), propylene carbonate (PC), butylene carbonate (BC), fluoroethylene carbonate (FEC), or the like. Non-limiting examples of the linear carbonates include diethyl carbonate (DEC), dimethyl carbonate (DMC), dipropyl carbonate (DPC), ethyl methyl carbonate (EMC), methyl propyl carbonate (MPC), or the like. Non-limiting example of the lactone includes gamma-butyrolactone (GBL), and Non-limiting examples of the ether include dibutyl ether, tetra hydro furan, 2-methyl tetra hydro furan, 1,4-dioxane, diethoxy ethane dimethoxy ethane, or the like. Non-limiting examples of the ester include methyl formate, ethyl formate, propyl formate, methyl acetate, ethyl acetate, propyl acetate, pentyl acetate, methyl propionate, ethyl propionate, propyl propionate, butyl propionate, methyl pivalate, or the like. Non-limiting example of the ketone includes poly methyl vinyl ketone. Halogen derivatives of the above electrolyte solvents may also be used. The above electrolyte solvents may be used alone or in combination.

Further, the present invention provides a method for identifying the origin or kind of the electrode itself or the electrochemical device comprising the same by using the aforementioned electrode into which the organic/inorganic composite is introduced.

The organic/inorganic composite comprises the inorganic particle(s) having a unique spectrum or color pattern according to a predetermined rule. Therefore, it is possible to identify the origin or kind of the electrode itself or the electrochemical device comprising the same by using a sensor for observing a spectrum or color pattern (including the naked eye, and a conventional spectrometer such as a visible light spectrometer) to check whether the spectrum or color pattern (e.g. color, brightness or saturation under a specific wavelength or chemical condition) of the organic/inorganic composite introduced onto the surface of the electrode conforms to the predetermined rule or not. In this manner, it is possible to identify the authenticity of the electrode or electrochemical device according to the present invention. It is also possible to distinguish one type of electrode or electrochemical device from the others. Therefore, any electrode or electrochemical device can be prevented from being misused during a manufacturing process.

BRIEF DESCRIPTION OF THE DRAWINGS

The foregoing and other objects, features and advantages of the present invention will become more apparent from the following detailed description when taken in conjunction with the accompanying drawings in which.

MODE FOR INVENTION

Figure 1:
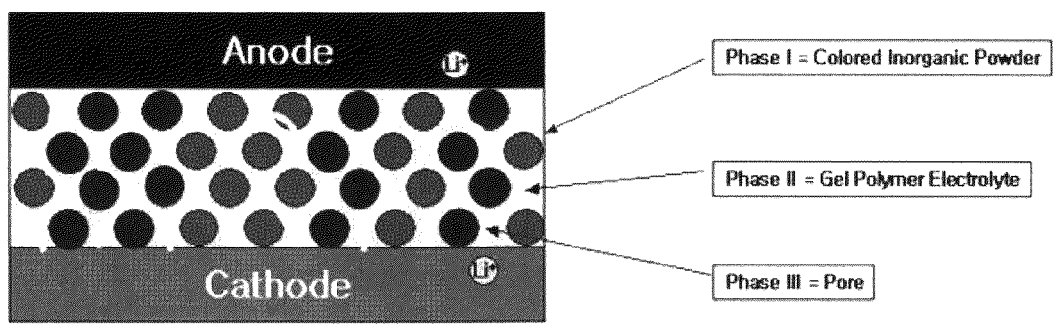
FIG. 1 is a schematic view showing the electrode comprising the organic/inorganic composite according to the present invention.
Figure 2:
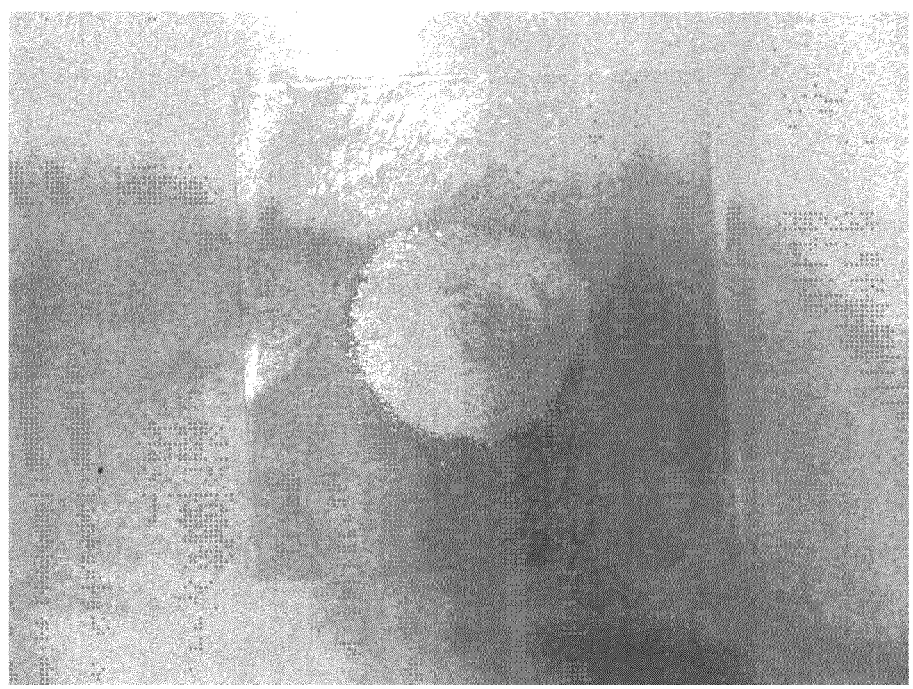
FIG. 2 is a photographic view showing the alumina powder used for preparing the electrode according to Comparative Example 1.
Figure 3:
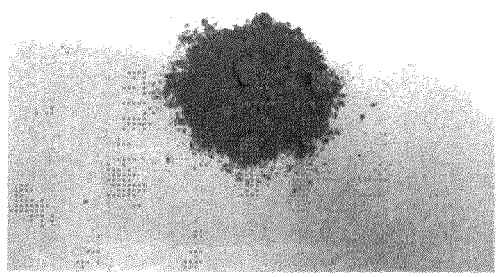
FIG. 3 is a photographic view showing the $CoAl_2O_4$, $Cr_2O_3$, $Fe_2O_3$ and $(Ti, Ni, Sb)O_2$ powder, each used for preparing the electrodes according to Examples 1~6.
Figure 3:
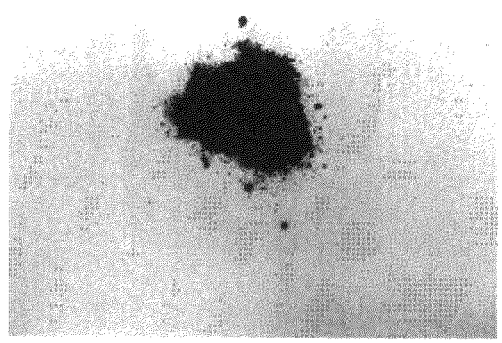
Figure 3:
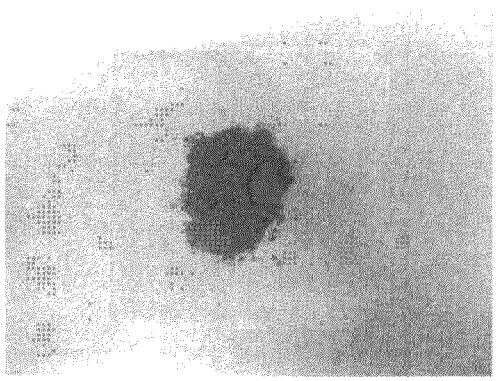
Figure 3:
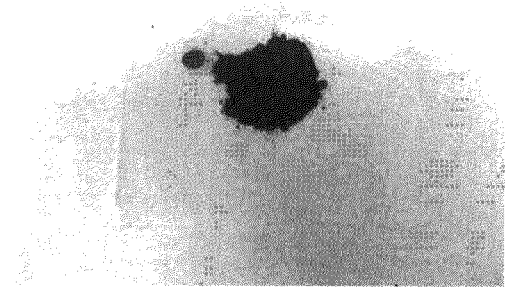

Reference will now be made in detail to the preferred embodiments of the present invention. It is to be understood that the following examples are illustrative only and the present invention is not limited thereto.

Example 1

1-1. Manufacture of Electrode Comprising Organic/Inorganic Composite Introduced Thereto (Manufacture of Cathode)

To N-methyl-2-pyrrolidone (NMP) as a solvent, 94 wt % of $LiCoO_2$ as a cathode active material, 3 wt % of carbon black as a conductive agent and 3 wt % of PVdF as a binder were added to form slurry for a cathode. The slurry was coated on Al foil having a thickness of about 20 μm as a cathode collector, and then dried to form a cathode. Then, the cathode was subjected to roll press.

(Manufacture of Anode)

To NMP as a solvent, 96 wt % of carbon powder as an anode active material, 3 wt % of polyvinylidene fluoride (PVdF) as a binder and 1 wt % of carbon black as a conductive agent were added to form mixed slurry for an anode. The slurry was coated on Cu foil having a thickness of about 10 μm as an anode collector, and then dried to form an anode. Then, the anode was subjected to roll press.

(Manufacture of Electrode Comprising Organic/Inorganic Composite Introduced Thereto)

About 5 parts by weight of a polyvinylidene fluoride-chlorotrifluoroethylene copolymer (PVdF-CTFE copolymer) was added to 100 parts by weight of acetone and dissolved therein at 50° C. for about 12 hours or more to provide a polymer solution. To the preformed polymer solution, a mixture containing inorganic particles developing a blue color in the visible light region, $CoAl_2O_4$, and PvdF-CTFE in a weight ratio of 80:20 was added, and then the inorganic particles were crushed and dispersed by using a ball mill for 12 hours or more to provide slurry. In the slurry, the inorganic particles had a particle diameter of 400 nm.

Then, the slurry was coated onto the surface of the cathode and the anode obtained as described above via a dip coating process, followed by drying, to provide a cathode and an anode each comprising the organic/inorganic composite introduced thereto.

1-2. Manufacture of Lithium Secondary Battery

The anode and the cathode comprising the organic/inorganic composite introduced thereto as described in Example 1-1 were stacked to provide an electrode assembly. Then, an electrolyte was injected into the electrode assembly to provide a secondary battery. The electrolyte contained 1M lithium hexafluorophosphate ($LiPF_6$) dissolved in ethylene carbonate (EC) and ethyl methyl carbonate (EMC) in a volume ratio of 1:2 (EC/EMC).

Example 2

An electrode comprising an organic/inorganic composite introduced thereto and a lithium secondary battery were provided in the same manner as described in Example 1, except that inorganic particles developing a green color in the visible light region, $Cr_2O_3$, were used instead of $CoAl_2O_4$.

Example 3

An electrode comprising an organic/inorganic composite introduced thereto and a lithium secondary battery were provided in the same manner as described in Example 1, except that inorganic particles developing a red color in the visible light region, $Fe_2O_3$, were used instead of $CoAl_2O_4$.

Example 4

An electrode comprising an organic/inorganic composite introduced thereto and a lithium secondary battery were provided in the same manner as described in Example 1, except that inorganic particles developing a yellow color in the visible light region, $(Ti,Ni,Sb)O_2$, were used instead of $CoAl_2O_4$.

Example 5

An electrode comprising an organic/inorganic composite introduced thereto and a lithium secondary battery were provided in the same manner as described in Example 1, except that inorganic particles containing $CoAl_2O_4$ and $Fe_2O_3$ in a weight ratio of 33:67 were used instead of $CoAl_2O_4$.

Example 6

An electrode comprising an organic/inorganic composite introduced thereto and a lithium secondary battery were provided in the same manner as described in Example 1, except that inorganic particles containing $CoAl_2O_4$ and $Fe_2O_3$ in a weight ratio of 67:33 were used instead of $CoAl_2O_4$.

Comparative Example 1

An electrode comprising an organic/inorganic composite introduced thereto and a lithium secondary battery were provided in the same manner as described in Example 1, except that inorganic particles developing a white color in the visible light region, alumina, were used instead of $CoAl_2O_4$.

Experimental Example

Figure 6:
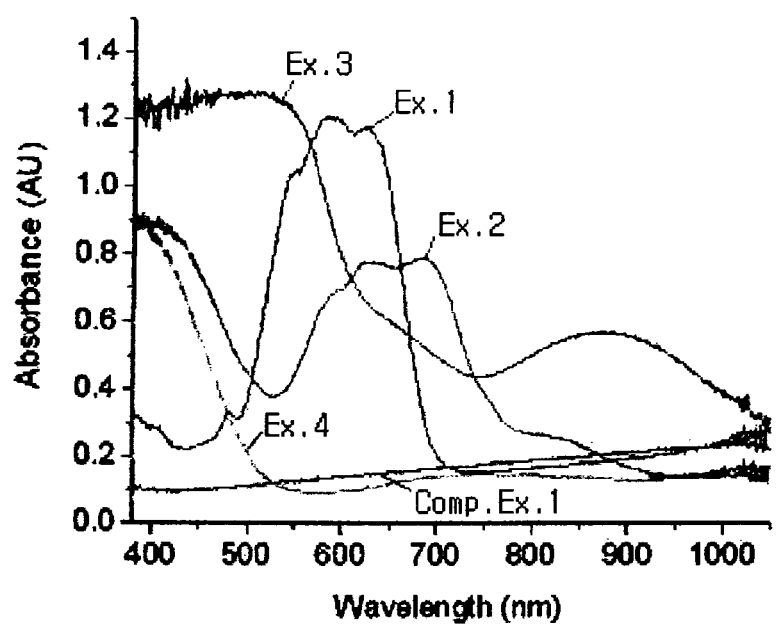
FIG. 6 is the absorption spectra of the electrodes comprising the organic/inorganic composites according to Examples 1~6 and Comparative Example 1.
Figure 6:
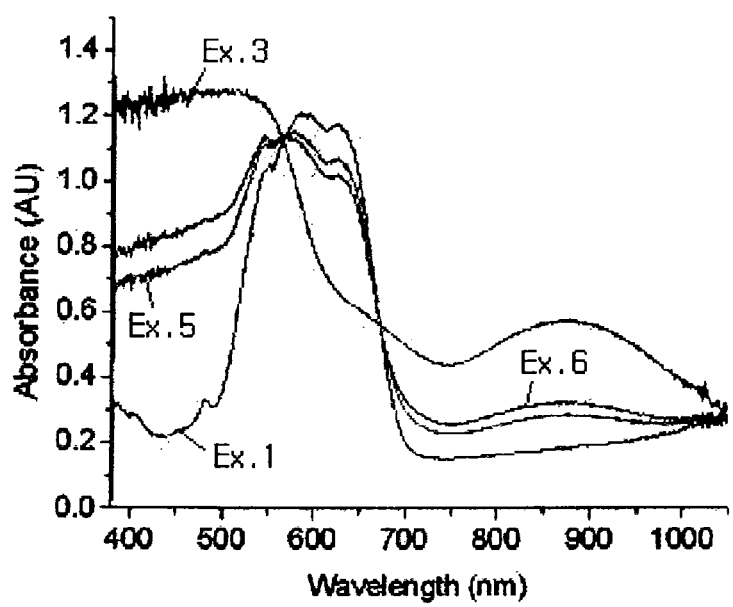

The absorption spectra of the electrodes comprising the organic/inorganic composites according to Examples 1~6 and Comparative Example 1 were observed by using a spectrometer. The results are shown in FIG. 6. It can be seen from the experimental results that the electrode comprising the organic/inorganic composite according to the present invention shows a different spectrum depending on the kind and content of the inorganic particle. Such a specific spectrum can function as a means for identifying the electrode itself or the electrochemical device using the same.

Figure 4:
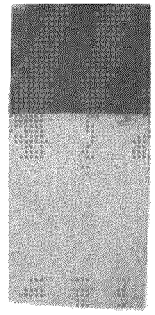
FIG. 4 is a photographic view showing the electrodes comprising the organic/inorganic composites according to Examples 1~6.
Figure 4:
Figure 4:
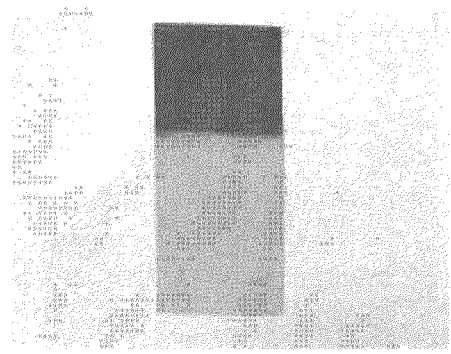
Figure 4:
Figure 4:
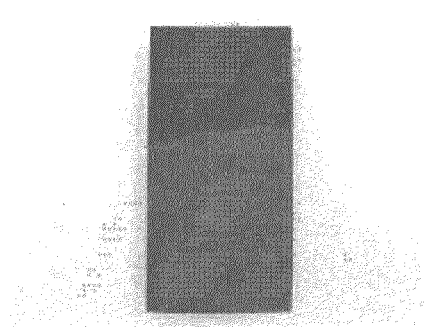
Figure 4:
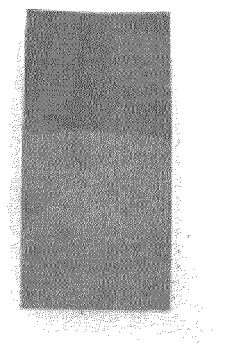
Figure 5:
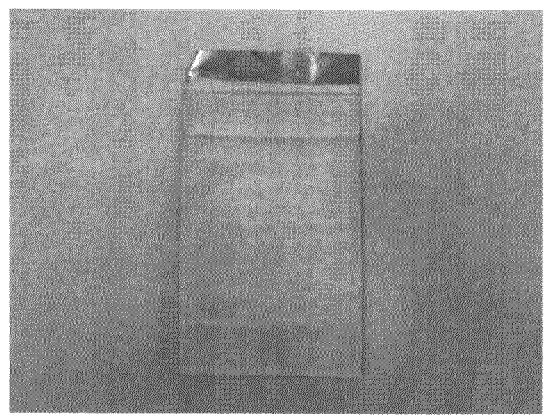
FIG. 5 is a photographic view showing the electrode comprising the organic/inorganic composite according to Comparative Example 1.

Meanwhile, FIGS. 4 and 5 show the photographic views of the electrodes according to Examples 1~6 and Comparative Example 1, taken in the visible light range. It can be seen from the above results that the electrode comprising the organic/inorganic composite according to the present invention can be identified sufficiently with the naked eye.

Industrial Applicability

As can be seen from the foregoing, according to the present invention, it is possible to identify the origin or kind of the electrode itself or the electrochemical device using the same electrode without any modification or addition in the structure of the device. Thus, it is possible to identify the authenticity of the electrode or electrochemical device according to the present invention. It is also possible to distinguish one type of electrode or electrochemical device from the others. Therefore, any electrode or electrochemical device can be prevented from being misused during a manufacturing process.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for detecting a counterfeit electrochemical device, the method comprising:
    a) introducing inorganic particles or aggregates onto a surface of a cathode, a surface of an anode, or surfaces of a cathode and an anode, wherein the inorganic particles or the aggregates are included in an organic/inorganic composite which serves as a separator, and wherein a spectrum of the inorganic particles or the aggregates follows a predetermined rule that identifies the origin of the organic/inorganic composite and distinguishes the organic/inorganic composite from a counterfeit organic/inorganic composite introduced onto a surface of a cathode, a surface of an anode, or surfaces of a cathode and an anode manufactured by a third party;
    b) observing the spectrum of the inorganic particles or the aggregates with a sensor; and,
    c) checking whether the observed spectrum conforms to the predetermined rule.

2. The method of claim 1, wherein the sensor is a spectrometer.

3. The method of claim 1, wherein the inorganic particles or the aggregates are selected from the group consisting of:
    (i) inorganic particles or aggregates having a unique spectrum or color pattern in the visible light range;
    (ii) inorganic particles or aggregates having a unique spectrum or color pattern in the non-visible light range; and
    (iii) inorganic particles or aggregates having a unique spectrum or color pattern under a specific chemical condition.

4. The method of claim 1, wherein the inorganic particles or aggregates are at least one selected from the group consisting of $Al_2O_3$, ZnO, ZnS, $SiO_2$, $ZrO_2$, $SnO_2$, $CeO_2$, MgO, CaO, $Y_2O_3$, $TiO_2$, $Sb_2O_3$, $BaTiO_3$, $SrTiO_3$, $Pb(Zr,Ti)O_3$ (PZT), $Pb_{1-x}La_xZr_{1-y}Ti_yO_3$ (PLZT), $Fe_3O_4$, (Co, Ni)O—(Cr, Fe)$_2O_3$, $PbCrO_4$, $ZnCrO_4$, $BaCrO_4$, CdS, $FeO(OH)nH_2O$, $TiO_2$—NiO—$Sb_2O_3$, $Pb(CN)_2$, $Ca_2PbO_4$, Al,Fe,Sn-2PbO—$Sb_2O_5$, V—$SnO_2$, V—$ZrO_2$, Pr—$ZrSiO_4$, $CrSbO_4$ or $Cr_2WO_6$—$TiO_2$, $ZrSO_4$ coated CdS or (CdZn)S, $PbCrO_4PbO$, $PbCrO_4PbMoO_4$, $PbSO_4$, $Fe_2O_3$+FeO, $Fe_2O_3$+$MnO_2$+$Mn_3O_4$, ZnO .(Al, Cr, Fe) $_2O_3$, $Fe_2O_3$, $Pb_3O_4$, HgS, CdS+CdSe, CdS+HgS, $2Sb_2S_3$ $Sb_2O_3$, $Co_3(PO_4)_2$, $Co_3(PO_4)_2$ $4H_2O$, $Co_3(PO_4)_2$ $8H_2O$, 3NaAl $SiO_4$ $Na_2S_2$, $Fe_4[Fe(CN)_6]_3$ $nH_2O$, CoO $nAl_2O_3$, CoO $nSnO_2$ mMgO, $Co_3O_4$+$SiO_2$+$Al_2O_3$+$Fe_2O_3$+NiO+MnO, CoO-$nAl_2O_3$ or (Co, Zn)O-$nAl_2O_3$, 2(Co, Zn)O .$SiO_2$, V—$ZrSiO_4$, $Cr_2O_3$, $Cr_2O(OH)_4$, $Cu(CH_3CO_2)_2 3CuO(AsO_2)_2$, CoO—ZnO—MgO, (Co, Zn)O .(Al, Cr)$_2O_3$, 3CaO—$Cr_2O_3$ .$3SiO_2$, (Al, Cr)$_2O_3$, Sb—$SnO_2$, Co,Ni—$ZrSiO_4$, Mn,P-α-$Al_2O_3$, ZnO .(Al, Cr)$_2O_3$, Cr—CaO .$SnO_2$ .$SiO_2$, Fe—$ZrSiO_4$, Cr,Co—CaO.$SnO_2$.$SiO_2$, $ZrSiO_4$ coated Cd(S,Se), ZnS, $Zn_2SiO_4$, (Zn,Cd)S, CaS, SrS, $CaWO_4$, SiC and $Si_3N_4$.

5. The method of claim 1, wherein the organic/inorganic composite comprises a polymer capable of interconnecting and fixing the inorganic particles.

6. The method of claim 5, wherein the inorganic particles or the aggregates and the polymer are used in a weight ratio of 10:90-99:1.

7. The method of claim 5, wherein the inorganic particles or the aggregates and the polymer are used in a weight ratio of 50:50-99:1.

8. The method of claim 5, wherein the inorganic particles or aggregates are selected from the group consisting of $CoAl_2O_4$; Cr2O3; $Fe_2O_3$; (Ti,Ni,Sb)$O_2$; and, $CoAl_2O_4$ and $Fe_2O_3$;
    wherein the inorganic particles or the aggregates and the polymer are used in a weight ratio of 33:67-80:20.

9. The method of claim 1, wherein the inorganic particles or the aggregates have a size of 0.001 μm -10 μm.

10. The method of claim 1, wherein the polymer has a glass transition temperature of −200° C. -200 ° C.

11. The method of claim 5, wherein the polymer can be gelled by being impregnated with an electrolyte.

12. The method of claim 5, wherein the polymer has a solubility parameter of 15- 45$MPa^{1/2}$.

13. The method of claim 5, wherein the polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, and polyvinylalcohol.

14. The method of claim 1, wherein the organic/inorganic composite has pores.

15. The method of claim 14, wherein the organic/inorganic composite is entangled with the pores of the electrode by a polymer capable of interconnecting and fixing the inorganic particles.

16. The method of claim 1, wherein the organic/inorganic composite is introduced to a thickness of 1 μm - 10 μm along the thickness direction of the electrode.

* * * * *